UNITED STATES PATENT OFFICE.

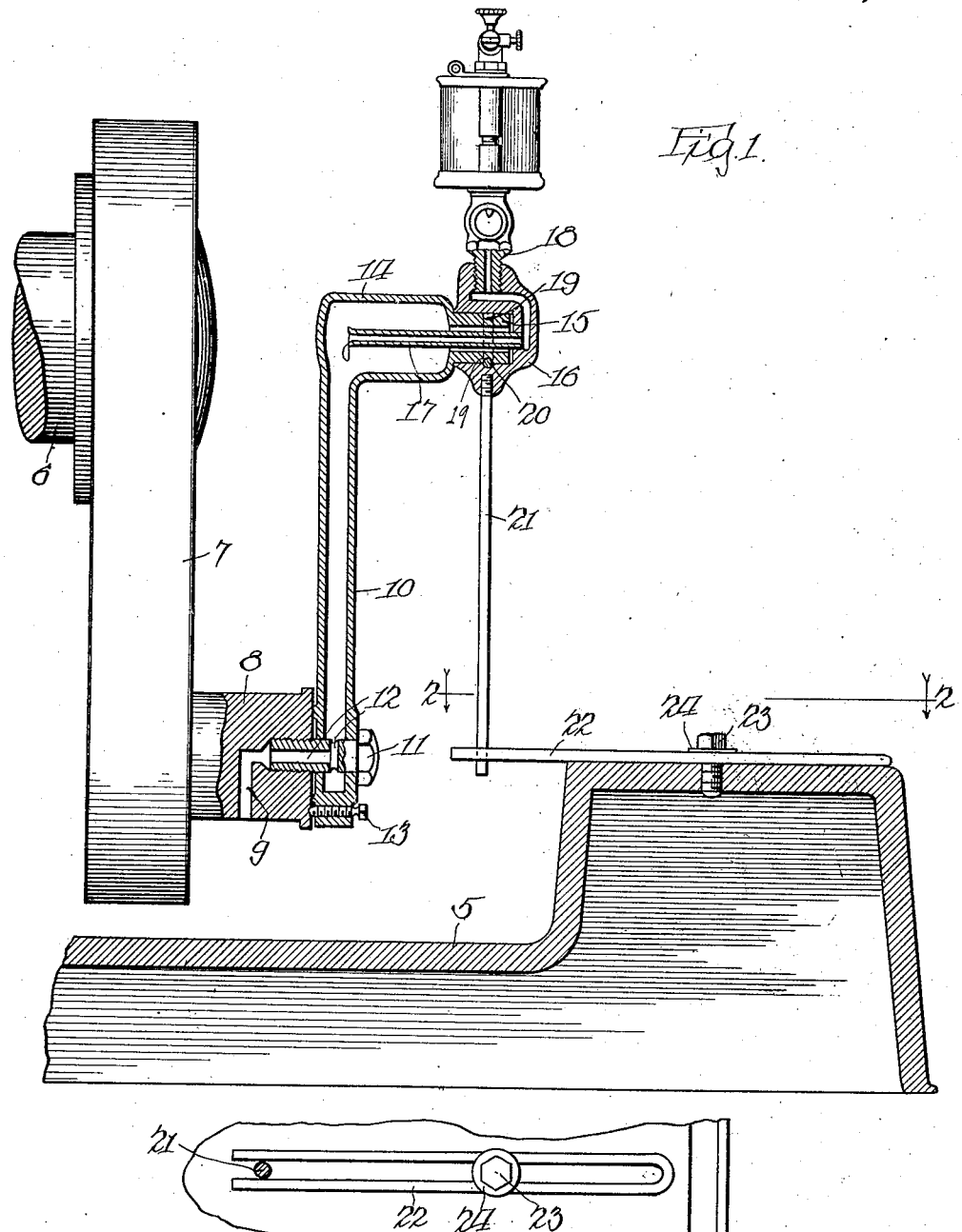

WILLIAM W. NUGENT, OF CHICAGO, ILLINOIS.

GRAVITY CENTER-OILER.

1,352,986.  Specification of Letters Patent.  Patented Sept. 14, 1920.

Application filed February 23, 1918. Serial No. 218,644.

*To all whom it may concern:*

Be it known that I, WILLIAM W. NUGENT, a citizen of the United States, residing at Chicago, in the county of Cook and State of Illinois, have invented certain new and useful Improvements in Gravity Center-Oilers, of which the following is a specification.

My invention relates to oiling mechanism, and more particularly to such devices for the use of oiling crank pins, movable bearings, and the like.

The object of my improvement is a provision of a simple and efficient means for conducting oil to such movable bearings, crank pins, and the like, and means for holding such oiling devices against movement and in operative positions.

Other objects will appear hereinafter.

An embodiment of my invention is shown in the accompanying drawing, forming a part of this specification, and in which—

Figure 1 is a view partly in section showing fragments of an engine equipped with my device, the latter being partly in section also; and Fig. 2 is a detail fragment taken on line 2—2 of Fig. 1.

In Fig. 1 I have shown a fragment 5 of an engine bed plate, which may be of any conventional or preferred design. I have also shown a fragment of a crank shaft 6, a crank 7, and a crank pin 8, the latter being shown partly in section in Fig. 1 to show the oil conducting passage 9 therein. Said oil passage preferably extends into the end of the crank pin at substantially the axis thereof and from thence out through the periphery of such pin so that oil may be passed from the center of the pin out to the parts of the latter which engages the piston rod bearing, the latter not being shown. On the end of the crank pin 8 I secure a hollow arm 10 by means of a cap screw 11 which is provided with perforations 12 therein, said perforations 12 leading from the interior of the arm 10 to the oil passage 9. At the extreme end of the arm 10 I provide a set screw 13, the inner end of which is adapted to be forced against the face of the crank pin after the radius arm has been accurately adjusted so as to lock it in adjusted position.

The end 14 of the arm 10 is preferably enlarged and the center of said enlargement in substantial alinement with the axis of the crank shaft 6. On the enlargement 14, and in actual alinement with the shaft 6, I provide a bearing or boss 15 which is hollow with the hollow portion communicating with the hollow of the end 14. Journaled on the bearing 15 is an oil cup holder 16, the latter having a passage extending from its top side down around to a point substantially axial of the fitting 14 and provided with a tube 17 in said holder so that oil passing down through the holder passes through the tube 17 and drops from the inner end of said tube into the hollow portion of the arm 10. After such oil drops into the enlarged part 14, centrifugal force, caused by rotation of the arms 7 and 10, causes the oil to fly outwardly and to enter the passages 12 and 9 to conduct the oil to the periphery of the crank pin 8. In the upper opening of the oil cup holder 16 is threaded, or otherwise secured, an oil cup 18; the latter may be of any preferred or conventional design. The oil cup holder may be held on the bearing 15 in any desirable manner. I have shown a peripheral groove 19 cut in the bearing 15 and a pin, such as a cotter pin 20 passed through the holder 16 and engaging the groove 19 so that the bearing 15 is free to revolve in the holder, and, so that the latter is incapable of movement longitudinally of such bearing. By removing the cotter pin, however, the oil cup and holder may be detached from the journal bearing 15 when desired.

Secured in the lower side of the holder 16 is a rod or arm 21. This arm 21 may be secured to the holder 16 by threading, as indicated, or in any other desirable manner. The lower end of the rod 21 extends downwardly to a point near the bed plate 5 where it is held so as to prevent rotation of the oil cup holder 16 with the bearing 15 and yet permits of slight movement of the rod so that if the arm 10 becomes displaced so that the axis of the journal bearing 15 is not in actual alinement with the axis of the shaft 6, the arm 21 will be free to move and yet sufficiently rigid to prevent rotation of the oil cup holder. I have found it desirable to use means for positively holding such arm against rotation or oscillation and prefer, for this purpose, a U-shaped member 22 which may be a rod bent into this form, as shown in Fig. 2, and rigidly held against movement on the bed plate 5 by a cap screw 23 and a washer 24, as shown in Fig. 1.

With a construction such as this U-shaped member 22, the lower end of the rod 21 may be held in various positions relatively to the bed plate in order to hold the oil cup in vertical or other desired positions. While such a U-shaped member is preferable, it should be understood that various modifications might be used, without departing from the spirit and scope of my invention, as defined by the claims hereto appended. For instance, the member 22 may be adjustably held in position and one side only thereof engaged by the rod 22, depending upon the direction of rotation of the crank shaft; or the member 22 may be a perforated plate adjustably mounted where pivoted to the bed plate and arranged so that the rod 21 may extend through any one of the perforations of such plate. While, therefore, I have illustrated and described the preferred form of my invention, I desire not to be limited to the exact structure disclosed, but wish to avail myself of such variations and modifications as come within the scope of the appended claims.

It should be noted that since the oil cup holder 16 is connected to the journal bearing 15 by means of the cotter pin 20, the oil cup holder 16 may be detached from the journal bearing after driving the cotter pin 20 out of the circumferential groove 19. The depending rod 21 may readily slide along the space between the prongs of the U-shaped member 22 when the oil cup holder 16 is pulled off the journal bearing 15. The oil cup, oil cup holder and depending rod are rigidly connected together and may be removed in their entirety from the journal bearing 15 while the engine is running at full speed. Operation of the engine is therefore not interrupted although there may be what is called a "hot pin" which necessitates the removal of the oil cup holder until the hot pin has been cooled off. This cooling may be effected by flooding the pin 8 with oil while the engine is running at full speed, or water may be applied. Whatever the cooling medium may be, it will come into contact with the pin first and make it contract away from the hot brasses while if the cooling medium be applied to the brasses and strap or from the exterior, said parts will shrink first and grip the hot pin more tightly and make matters worse. It is therefore desirable in a gravity center oiler to have the structure such that the oil cup holder may be readily removed and the cooling medium applied to the receptacle 14 and along the tube 10 into the pin 8 so as to make the latter contract before cooling those parts in which the pin 8 is journaled. The U-shaped member 22 although adjustable angularly on the bed plate 5 as well as longitudinally of itself, is always in position to permit removal of the oil cup holder together with the depending rod 21 because the latter has ample space provided for its movement toward the bed plate to a position where the holder 16 is entirely disconnected from the journal bearing 15.

It should also be noted that the holder 16, together with the oil cup and the depending rod 21 which are rigidly connected to the holder, derive their sole support from the journal bearing 15 and the latter rotates within the holder 16 on an axis which should coincide with the axis of the shaft 6. If, however, adjustment of the journal bearing 15 is not secured exactly in alinement with the axis of the shaft 6, the oil cup and its holder will nevertheless remain in proper position because the rod 21 is free to slide up and down in the fork 22. It will be seen that the depending rod 21 is un-counterweighted but that it engages the fork 22 so that the latter will positively prevent any swinging of the depending rod 21 on the horizontal axis of the journal bearing 15. The arrangement of the depending rod 21 and the fork 22 therefore permits the gravity oil cup to be supported solely on the journal bearing 15, while any proclivity of the oil cup to upset is prevented.

I claim:—

1. The combination with a crank shaft, of a crank arm, a crank pin on said crank arm, a tubular arm secured to said crank pin and extending to the axis of said crank arm, an extension on said tubular arm provided with a cylindrical bearing concentric with the said shaft, an oil cup holder detachably mounted on said cylindrical bearing, an oil cup mounted on said holder to move bodily therewith, there being an oil passage leading from the discharge end of the oil cup through said oil cup holder, extension, tubular arm and crank pin and terminating in the periphery of the latter, a depending rod secured to said oil cup holder to move bodily therewith, said oil cup holder, oil cup and depending rod being supported entirely by said cylindrical bearing, a two-prong fork, and means for adjustably securing said fork to the bed plate of the engine in position to embrace the lower end of said depending rod and act as as abutment to hold said oil cup in upright gravity feeding position during the operation of the engine while not interfering with the removal of said oil cup holder from said cylindrical bearing during the operation of the engine when a cooling medium is to be introduced through said cylindrical bearing, extension and tubular arm exteriorly of said crank pin.

2. The combination with a crank arm, of a crank pin on said crank arm, a hollow arm secured to said crank pin and extending to the axis of said crank arm, an extension on said hollow arm substantially on the axis of said crank arm, an oil cup holder journaled on said extension for support thereby, an oil cup mounted on said holder, there being an oil passage leading from the discharge end of the oil cup through said oil cup holder, extension, hollow arm and crank pin and terminating in the periphery of the latter, a rod extending from said oil cup holder, said oil cup holder together with said oil cup and said rod being supported solely by said extension, and a fork member adapted to occupy a stationary position to engage opposite sides of the rod to hold said oil cup holder against rotation on said axis during the operation of said crank arm.

3. The combination with engine structure comprising a crank arm and a crank pin, of lubricating mechanism comprising a tubular arm secured rigidly to said crank pin and extending to the axis of the crank arm, a journal bearing connected to said tubular arm at said axis to rotate with said crank shaft, an oil cup holder mounted on said journal bearing for support thereby, an oil cup mounted on said holder to move bodily therewith, there being an oil passage leading from the discharge end of said oil cup to said oil cup holder, journal bearing and tubular arm to said crank pin, a rod connected to the said oil cup holder to move bodily therewith, said rod together with said oil cup holder and said oil cup deriving their sole support from said journal bearing, and a U-shaped member mounted in stationary position substantially parallel with the axis of the crank arm in position to engage opposite sides of said rod for holding the oil cup holder against rotation on said axis during the operation of said crank arm.

4. The combination with a hollow supporting member having a journal bearing on a substantially horizontal axis, of a member to be lubricated connected to said hollow support, an oil cup holder loosely mounted on said journal bearing and having an oil duct communicating with the interior of said supporting member, an oil cup mounted on said holder to move bodily therewith, a rod secured to said holder and depending therefrom, said holder and said oil cup and said rod being rigidly connected together and in their entirety deriving their sole support from said journal bearing, and a U-shaped member adapted to be secured in stationary and fixed position to engage the lower end of said rod and hold the oil cup upright in gravity feeding position by resisting the proclivity of said oil cup to becoming upset during the rotation of said journal bearing and the lubrication of said member being lubricated.

5. In a gravity center oiler, the combination with a crank shaft, of a crank arm extending radially therefrom, a crank pin on said crank arm, an additional arm extending from said crank pin to the axis of said crank shaft in spaced-apart relation to said crank arm and substantially parallel thereto, a supporting bearing on said additional arm substantially in alinement with the center of said shaft, an oil cup holder mounted on said supporting bearing for rotation of the latter within said holder substantially on the axis of said crank shaft, an oil cup mounted on said oil cup holder to move bodily therewith, and a slotted device secured to a stationary object in fixed position to act as a fixed and stationary abutment to prevent said oil cup holder from oscillating or rotating on said axis but holding said oil cup in upright gravity feeding position during the rotation of said supporting bearing in said holder and while said holder and said oil cup derive their sole support from said supporting bearing.

6. In a gravity center oiler, the combination with a crank shaft, of a crank arm thereon, a crank pin on said crank arm, a tubular arm secured to said crank pin and spaced from said crank arm and extending to the axis of said shaft, an extension on said tubular arm in alinement with the said shaft, an oil cup holder pivotally mounted on said extension on the axis of said shaft, an oil cup mounted in upright position on said holder, connections for effecting the lubrication of said crank pin from said oil cup through said tubular arm upon the rotation of said shaft, a rod depending from said oil cup holder, said oil cup holder and said oil cup and said rod being rigidly connected together in a unitary structure deriving its sole support from said extension, a bed plate, a fork, and means for adjustably securing said fork to said bed plate to occupy a position extending approximately parallel to said axis with its prongs engaging opposite sides of the lower end of said rod to hold the oil cup in upright position and positively preventing proclivity toward the upsetting of said oil cup during the rotation of said shaft and the lubrication of said crank pin.

7. The combination with engine structure comprising a shaft, crank arm, crank pin and a bed plate, of a tubular arm secured to said crank pin and extending to the axis of said shaft, an extension from said tubular arm along the axis of said shaft, an oil cup holder mounted on said extension, an oil cup mounted on said oil cup holder in upright position for gravity feed, a rod depending from said oil cup holder, means for removably securing said oil cup holder to said extension while permitting rotation of said extension relatively to said oil cup holder, said oil cup holder and said oil cup and said rod being rigidly connected together in a unitary structure deriving its sole support from said extension, and a slotted member fixed in stationary position on said bed plate for engaging opposite sides of the lower end of said rod while providing a free and unobstructed space between the lower end of said rod and said bed plate along said member for preventing said rod from interfering with the removal of said oil cup holder from said extension when a cooling medium is to be introduced quickly through said tubular member to the interior of said crank pin.

8. In a gravity center oiler, the combination with a crank shaft, of a crank arm, a crank pin, an additional arm secured to said crank pin and extending to the axis of said shaft, an extension from said additional arm located in alinement with the axis of said shaft, an oil cup holder pivotally and removably connected to said extension for sole support thereby, an oil cup supported solely by said oil cup holder, an upright rod depending from said oil cup holder and secured thereto for sole support thereby, and a slotted device for engaging opposite sides of the lower end of said rod to hold said cup in upright gravity feeding position during the rotation of said shaft and of said extension while permitting free removal of said oil cup holder together with said oil cup and said rod from said extension.

9. In a gravity center oiler, the combination with a crank shaft, of a crank arm, a crank pin, a tubular arm connected to said crank pin in spaced-apart relation to said crank arm and parallel thereto, an extension on said tubular arm located approximately in alinement with the axis of said shaft and having a cylindrical bearing, an oil cup holder having a sleeve journaled on said bearing, an oil cup secured to the upper side of said oil cup holder, a rod secured to the lower side of said oil cup holder and depending therefrom, said oil cup holder and said oil cup and said depending rod being rigidly connected together to form a unitary structure deriving its sole support from said extension while mounted on said cylindrical bearing, a bed plate, a U-shaped member, means for adjustably securing said U-shaped member to said bed plate in position approximately parallel to said axis and to engage opposite sides of the lower end of said rod to hold the oil cup in upright gravity feeding position and positively prevent proclivity toward upsetting said oil cup during the rotation of said shaft and the rotation of said cylindrical bearing in said sleeve, and connections for effecting the lubrication of said crank pin from said oil cup upon such rotation of said crank shaft.

In testimony whereof I have signed my name to this specification on this 19th day of February A. D. 1918.

WILLIAM W. NUGENT.